(12) United States Patent
Tsuda et al.

(10) Patent No.: US 8,162,369 B2
(45) Date of Patent: Apr. 24, 2012

(54) CONSOLE BOX

(75) Inventors: Akihiro Tsuda, Hiroshima (JP);
Tomohide Okuda, Hiroshima (JP);
Takeo Matsui, Hiroshima (JP)

(73) Assignees: Nifco, Inc., Yokohama-Shi, Kanagawa (JP); Daikyo Nishikawa Corporation, Aki-Gun, Hiroshima (JP)

( * ) Notice: Subject to any disclaimer, the term of this patent is extended or adjusted under 35 U.S.C. 154(b) by 249 days.

(21) Appl. No.: 12/452,828

(22) PCT Filed: Jul. 29, 2008

(86) PCT No.: PCT/JP2008/063599
§ 371 (c)(1),
(2), (4) Date: Mar. 16, 2010

(87) PCT Pub. No.: WO2009/017130
PCT Pub. Date: Feb. 5, 2009

(65) Prior Publication Data
US 2010/0207414 A1 Aug. 19, 2010

(30) Foreign Application Priority Data
Jul. 30, 2007 (JP) .................................. 2007-198063

(51) Int. Cl.
*B60R 13/00* (2006.01)
(52) U.S. Cl. .................................................. 296/24.34
(58) Field of Classification Search ............... 296/24.34, 296/37.8, 37.1; 297/188.19, 411.35
See application file for complete search history.

(56) References Cited

U.S. PATENT DOCUMENTS

| | | | | |
|---|---|---|---|---|
| 5,085,481 | A * | 2/1992 | Fluharty et al. | 296/37.8 |
| 5,845,965 | A * | 12/1998 | Heath et al. | 297/188.19 |
| 6,045,173 | A * | 4/2000 | Tiesler et al. | 296/37.8 |
| 6,419,314 | B1 * | 7/2002 | Scheerhorn | 297/188.19 |
| 6,719,367 | B2 * | 4/2004 | Mic et al. | 297/188.19 |
| 6,932,402 | B2 * | 8/2005 | Niwa et al. | 296/24.34 |
| 7,004,527 | B2 * | 2/2006 | Niwa et al. | 296/24.34 |
| 7,029,048 | B1 * | 4/2006 | Hicks et al. | 296/24.34 |
| 7,029,049 | B2 * | 4/2006 | Rockafellow et al. | 296/37.8 |
| 7,114,772 | B2 * | 10/2006 | Kobayashi et al. | 297/188.04 |
| 7,234,746 | B2 * | 6/2007 | Sakakibara et al. | 296/24.34 |
| 7,413,229 | B2 * | 8/2008 | Kukucka et al. | 296/24.34 |
| 7,416,235 | B2 * | 8/2008 | Rajappa et al. | 296/37.8 |
| 7,429,068 | B2 * | 9/2008 | Busha et al. | 296/24.34 |
| 7,431,365 | B2 * | 10/2008 | Sturt et al. | 296/24.34 |
| 7,533,918 | B2 * | 5/2009 | Spykerman et al. | 296/24.34 |
| 7,731,258 | B2 * | 6/2010 | Bazinski et al. | 296/37.8 |

(Continued)

FOREIGN PATENT DOCUMENTS

JP S62-174954 7/1987

(Continued)

*Primary Examiner* — Kiran B Patel
(74) *Attorney, Agent, or Firm* — Manabu Kanesaka

(57) ABSTRACT

An engagement member (29), which is activated by operation of an operating button (40), is configured to be protruded from and retracted into respective positioning recesses (15, 16), facilitating the positional adjustment of a lid (3) and securing a high position-retaining force for the lid (3) in normal use. In order to cope with an accidental external force, a base member (7) includes a cantilever member (51) formed of slits, and the cantilever member (51) has a positioning recess (16) formed in a leading portion such that the cantilever member (51) is flexed to bring the engagement member (29) out of engagement with the positioning recess (16) when a load having a certain value or more is applied through the engagement member (29).

7 Claims, 11 Drawing Sheets

U.S. PATENT DOCUMENTS

| | | | |
|---|---|---|---|
| 7,766,408 B2 * | 8/2010 | Lota et al. | 296/37.1 |
| 7,770,953 B2 * | 8/2010 | Koarai | 296/24.34 |
| 7,770,954 B2 * | 8/2010 | D'Alessandro | 296/24.34 |
| 7,954,663 B2 * | 6/2011 | Depue | 220/813 |
| 8,002,323 B2 * | 8/2011 | Jones et al. | 296/37.1 |
| 8,029,065 B2 * | 10/2011 | Wieczorek et al. | 297/411.35 |
| 8,052,190 B2 * | 11/2011 | Vander Sluis et al. | 296/24.34 |
| 2005/0189807 A1 * | 9/2005 | Norman et al. | 297/411.35 |
| 2006/0166557 A1 * | 7/2006 | Ishikawa et al. | 439/610 |
| 2007/0075558 A1 * | 4/2007 | Kim et al. | 296/24.34 |
| 2007/0132284 A1 * | 6/2007 | Ekladyous et al. | 297/188.17 |
| 2010/0156129 A1 * | 6/2010 | Evans et al. | 296/24.34 |
| 2010/0314896 A1 * | 12/2010 | Skibinski et al. | 296/24.34 |
| 2011/0227359 A1 * | 9/2011 | Fesenmyer | 296/24.34 |

FOREIGN PATENT DOCUMENTS

| | | |
|---|---|---|
| JP | U-S63-126144 | 8/1988 |
| JP | U H06-7012 | 2/1994 |
| JP | H08-113086 | 5/1996 |
| JP | 2006-327329 | 12/2006 |
| JP | 2007-055386 | 3/2007 |
| JP | 2007-118623 | 5/2007 |
| JP | 2007-168567 | 7/2007 |

* cited by examiner

CONSOLE BOX

TECHNICAL FIELD

The present invention relates to a console box.

BACKGROUND ART

In a console box, a lid disposed on a box body is often utilized as an arm rest. In recent years, it has been proposed that a console box be configured to have a lid disposed thereon so as to be position-adjustable in a sliding direction in order to securely utilize the lid as an arm rest since automobile seats are disposed so as to be slidable in front and rear directions. For example, Patent Document 1 identified below has proposed that a console box have an upper wall member (support 12 extending in front and rear directions) disposed on a box body such that a lid is retained on the upper wall member so as to be slidable on the upper wall member, wherein the lid has an inner surface formed with series of positioning recesses (engagement recesses) in the front and rear directions, and the upper wall member has an engagement member through a spring, the engagement member being pressed against the inner surface of the lid under the biasing action of the spring.

This conventional console box can retain the lid with the lid positioned against the upper wall member by fitting the engagement member into an engagement recess. This conventional console box can also cause the engagement member to climb over each engagement recess so as to slide the lid with respect to the upper wall member when a sliding force is applied to the lid at a certain level or more (a level overcoming the biasing action of the spring). Thus, this conventional console box can perform the positioning adjustment of the lid. Further, even if a comparatively large external force is accidentally applied to a front portion of the lid in the rear direction when the lid is projected in the front direction, this conventional console box can move backward (retract) the lid so as to release such a large external force.

Patent Document 1: JP-Y-6-7012

DISCLOSURE OF THE INVENTION

Object to be Accomplished by the Invention

Such a type of console box can facilitate the positional adjustment of the lid and secure the retracting movement of the sliding member caused by an accidental external force. However, since such a type of console box is configured such that the position-retaining force of the lid is set at a relatively small value in order to smoothly achieve these actions, the console box is likely to allow the lid to easily move by application of an external force beyond such a small value of force (is susceptible to a decrease in the position-retaining force of the lid) because of having the position-retaining force for the lid set at such a relatively small value, although it is desired that the position of the sliding member be retained in the cases other than mentioned above. Although it is devised that the position-retaining force for the lid is set at a relatively large value in order to cope with this problem, the operability in the positional adjustment of the lid and the like are reduced.

The present invention has been provided in consideration of such circumstances. It is an object of the present invention to secure the requirements of facilitating the positional adjustment of a lid, allowing the lid to be retracted by application of an accidental relatively large external force and having a high position-retaining force for the lid in normal use in a console box including a box body and the lid disposed on the box body so as to be slidable thereon.

Means to Accomplish the Object

In order to attain the above-mentioned object, the present invention provides a console box including a box body and a lid disposed on the box body so as to be slidable thereon; further including:

the box body including an upper wall member forming a top end thereof;

one side of an upper side of the upper wall member and a lower side of the lid having a first engagement portion and a second engagement portion formed thereon, the second engagement portion being disposed at a position closer to a front side than the first engagement portion;

the other side of the upper side of the upper wall member and the lower side of the lid having an engagement member disposed thereon so as to be selectively protruded from and retracted into the other side under a biasing action;

the engagement member cooperating with an engagement-member operating member, which serves for retracting the engagement member into the other side;

the lid being configured to protrude more forward than the upper wall member when the engagement member is brought into engagement with the second engagement member in comparison with a case where the engagement member is brought into engagement with the first engagement portion; and the one side having a region where the second engagement portion exists, the region being configured to be deformed so as to bring the second engagement portion out of engagement with the engagement member when a load having a certain value or more is applied to the region through the engagement member engaged with the second engagement portion.

Effects of the Invention

In accordance with the present invention, when the engagement member is brought into engagement with the first or second engagement portion, the lid is positioned to be engaged with the first or second engagement portion, and the respective engaged states are retained unless the engagement member is retracted to be brought out of engagement with the first or second engagement portion by the engagement-member operating member. Thus, the lid is retained with a high position-retaining force. With respect to the facilitation of the positional adjustment of the lid, when the engagement member is retracted (is brought out of engagement with the first or second engagement portion) by the engagement-member operating member, the lid can be smoothly slid with respect to the upper wall member to be moved to a different engagement portion, i.e. the second or first engagement portion, simply being positioned there. With respect to the retracting movement of a slide member based on the application of an accidental relatively large external force, the lid can be reliably retracted backward, under a load set independently from the positional adjustment of the lid, from a state where the lid protrudes from the upper wall member. This is because the one side has a region where the second engagement portion exists, and the region is configured to be deformed so as to bring the second engagement out of engagement with the engagement member when a load having a certain value or more is applied to the region through the engagement member engaged with the second engagement portion. Thus, it is possible to secure the requirements of facilitating the positional adjustment of the lid, allowing the lid to be retracted by application of an accidental relatively large external force and having a high position-retaining force for the lid in normal use.

In the present invention, when the box body has an opening formed in the top end, when the upper wall member is configured to be swingably supported by the box body so as to open and close the opening of the box body, and when the lid is retained on the upper wall member so as to be slidable with respect to the upper wall member, a small article can be taken into and out of the inside of the box body through the top opening formed in the box body by opening the upper wall member in addition to having the above-mentioned functions and advantages.

When the one side has a cantilever member formed therein such that the cantilever member has a leading end facing a front side of the one side, and when the leading end of the cantilever member has the second engagement portion formed therein, the engagement member is brought into engagement with the second engagement portion in the leading end of the cantilever member to reliably retain the lid in a state (position) where the lid is protruded more forward than the upper wall member. When a load having a certain value or more is applied to the cantilever member through the engagement member engaged with the second engagement portion, the cantilever member is flexed so as to bring the engagement member out of engagement with the second engagement portion, retracting the lid backward independently from the positional adjustment of the lid.

In the present invention, when the cantilever member includes slits formed in the one side, additional parts do not need to be newly prepared, and it is possible to utilize an extremely simple structure to cope with the retracting movement of the lid based on the application of an accidental external force.

In the present invention, when the first engagement portion and the second engagement portion are formed on the upper side of the upper wall member, when the engagement member is formed on the lower side of the lid, and when the engagement-member operating member is disposed in a front portion of the lid, the engagement-member operating member can be easily activated for positional adjustment of the lid because of being disposed at a forefront without being concealed even if the lid is placed in a state where the lid is protruded more forward than the upper wall member.

Further, it is possible to reduce the force of a spring required for biasing the engagement member since the weight of (the gravity applied to) the engagement member per se is effectively utilized in a structure where the engagement member is protruded from the lower side of the lid.

In the present invention, when the upper wall member has a cantilever member formed therein, the cantilever member including slits formed in the upper wall member such that the cantilever member has a leading end facing a front side of the upper wall member; when the first engagement portion includes a first engagement recess, and the second engagement portion includes a second engagement recess, the second engagement recess being formed in a leading portion of the cantilever member; and when the upper side of the upper wall member is formed as a flat surface at least in the cantilever member and in a position between the cantilever member and the first engagement recess, such a simple structure can be utilized against the application of an accidental external force to bring the engagement member out of engagement with an inner wall (rear wall) of the second engagement recess, smoothly retracting the lid backward.

In the present invention, when a spring is interposed between the upper wall member and the lid, and when the spring is configured to bias the lid toward a position more forward than the front side of the upper wall member, the biasing action of the spring can be utilized to return the engagement member to the second engagement recess again and to return the lid to protrude from the upper wall member after the lid is retracted backward to release an accidental external force.

BEST MODE FOR CARRYING OUT THE INVENTION

Now, an embodiment of the present invention will be described in reference to the accompanying drawings.

Figure 1:
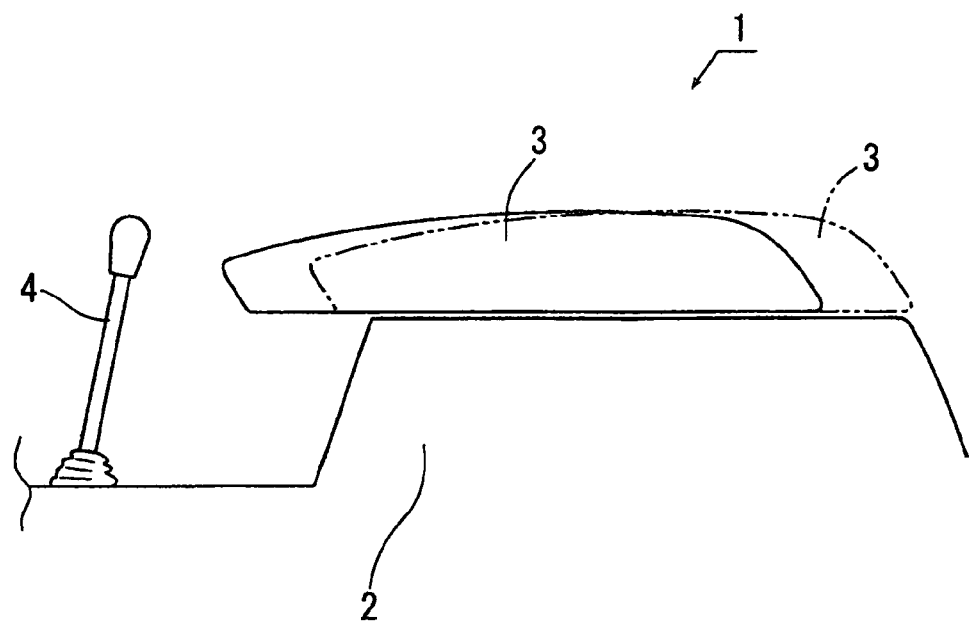
FIG. 1 is a schematic view showing how a lid slides in the console box according to an embodiment of the present invention.
Figure 2:
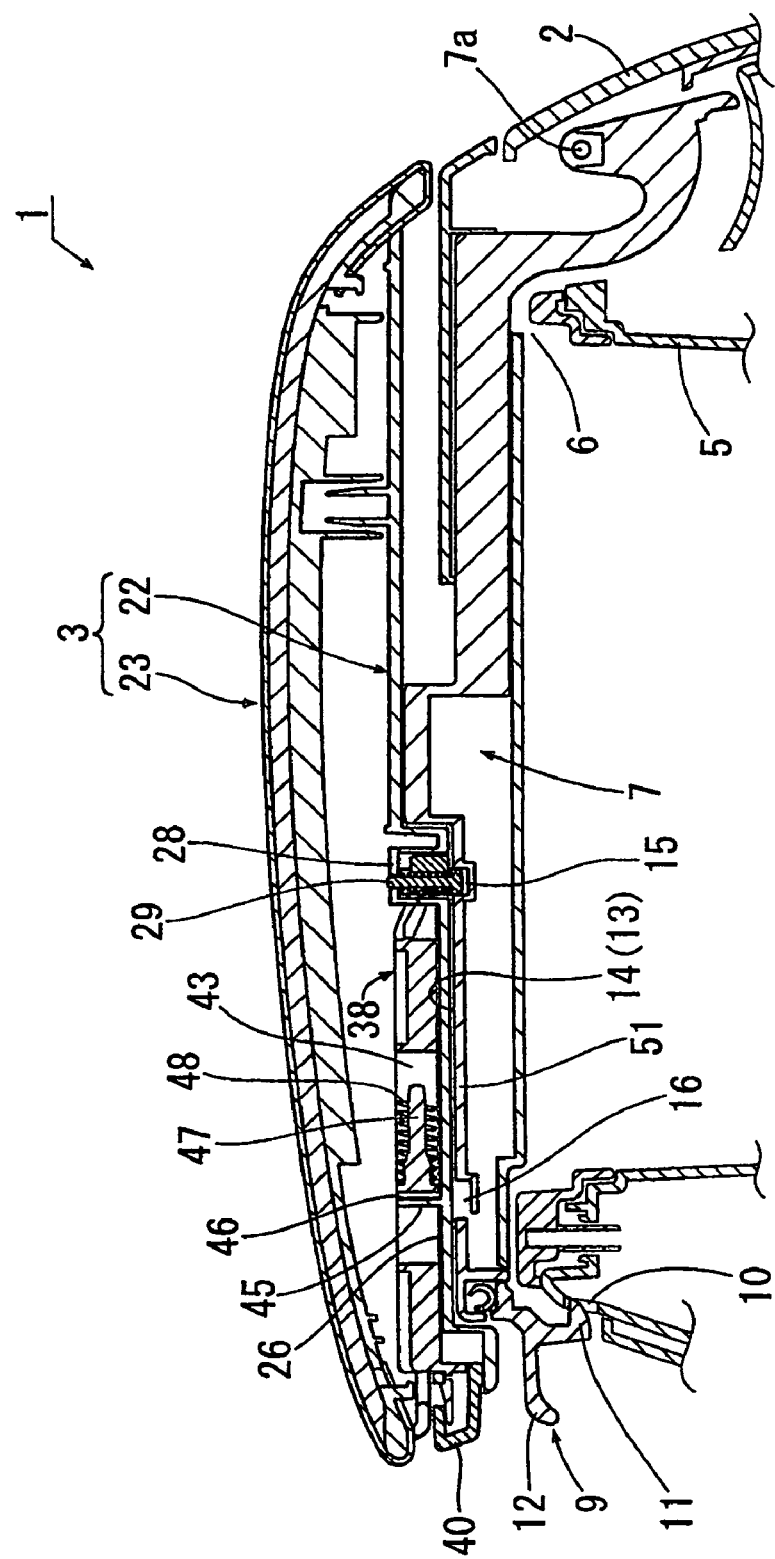
FIG. 2 is an enlarged longitudinal sectional view showing in what position the lid is placed in the console box according to the embodiment when the lid is not protruded.
Figure 3:
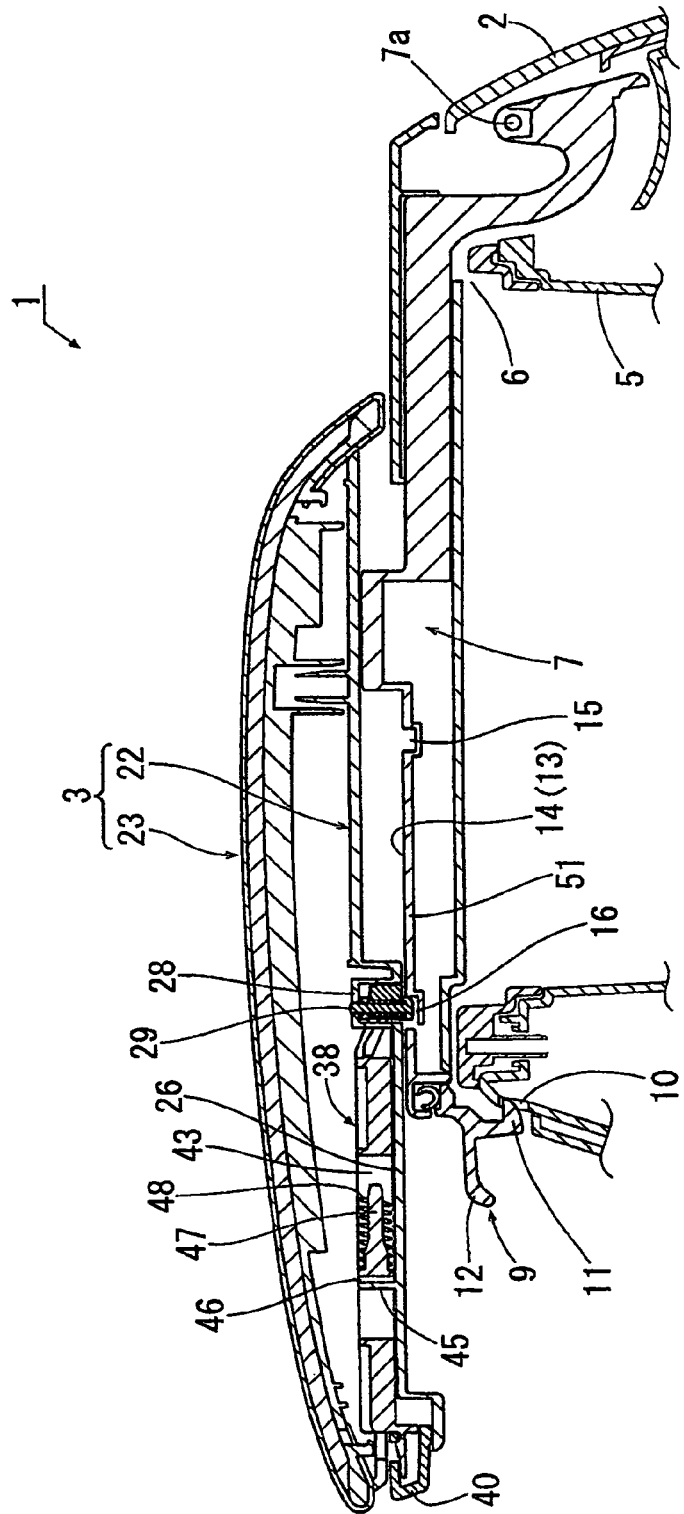
FIG. 3 is an enlarged longitudinal sectional view showing in what position the lid is placed in the console box according to the embodiment when the lid is protruded.

In FIG. 1 to FIG. 3, reference numeral 1 designates a console box, which extends in front and rear directions (left and right directions in FIG. 1). The console box includes a box body 2 and a lid 3 disposed on the box body 2.

As shown in FIG. 1 to FIG. 3, the box body 2 is fixed to the floor in an automobile, and the box body 2 is placed behind a shift lever 4. The box body 2 has a housing 5 formed therein. The housing 5 includes an opening 6 opened outward and upward such that a small article can be taken into and out of the housing 5 through the opening 6.

The box body 2 includes a base member 7 in an upper portion thereof so as to serve as an upper wall member. The base member 7 is formed as an elongated plate-like member so as to correspond to the opening 6 of the housing 5. The base member has a support 7a disposed at a rear portion (a portion shown on a right side in FIG. 2 and FIG. 3) and an operating lever 9 disposed at a front portion (a portion shown on a left side in FIG. 2 and FIG. 3). The support 7a is swingably supported by a rear portion of the box body 2 such that the base member 7 can open and close the opening 6 of the housing 5 (rise up and lie down) by swinging operation. In this regard, an unshown spring is interposed between the support 7a and the box body 2, and the spring biases the base member 7 in an opening direction. The operating lever 9 is swingably supported at a lower side of the front portion of the base member 7. The operating lever 9 includes an engagement pawl 11 engageable with an engagement hole 10 formed in the box body 2, and a lever 12 employed for a driver to perform opening and closing operation. When the engagement pawl 11 is brought into engagement with the engagement hole 10, the base member 7 is retained in a state where the opening 6 of the housing 5 is closed. When the lever 12 is swung to be lifted upward so as to bring the engagement pawl 11 out of engagement with the engagement hole 10, the base member 7 is raised up toward the rear direction by the biasing action of the unshown spring, thereby opening the opening 6 of the housing 5.

As shown in FIG. 2 and FIG. 3, the base member 7 is formed in a flattened shape having an inner space therein. As shown in FIG. 2 to FIG. 6, the base member has a flat wall 14 formed in a central portion in a width direction thereof (in a vertical direction in FIG. 5) so as to extend from the front portion to around a central portion in the front and rear directions in an upper side portion 13 thereof. The flat wall 14 of the base member 7 has a first positioning recess 15 as a first engagement portion (first engagement recess) and a second positioning recess 16 as a second engagement portion (second engagement recess) formed thereon, respectively, so as to be apart from each other in the front and rear directions. The first positioning recess 15 is located at a position closer to the rear portion of the base member than the second positioning recess 16. The second positioning recess 16 is located at a position slightly closer to the rear portion than the front portion of the base member 7. Each of the first positioning recess 15 and the second positioning recess 16 has a sponge material 50 disposed on a bottom surface therein in the shown embodiment.

As shown in FIG. 2 to FIG. 6, the flat wall 14 of the base member 7 has a cantilever member 51 formed therein at a position slightly closer to the rear portion than the front portion of the base member. The cantilever member 51 is disposed in an angulated U-character shape as seen in a plan view by providing the base member 7 with a pair of slits 17 so as to extend in the front and rear directions and a slit 18 connecting between the front ends of the paired slits 17. The cantilever member 51 is configured to be flexible on the basis of rear ends of the paired slits 17 in a thickness direction of the base member 7. The cantilever member 51 has a leading portion (front portion) formed to be stepped so as to be slightly retracted more downward than a rear-side portion following the leading portion. The leading portion of the cantilever member 51 is formed as described above, thereby providing the above-mentioned second positioning recess 16.

Figure 4:
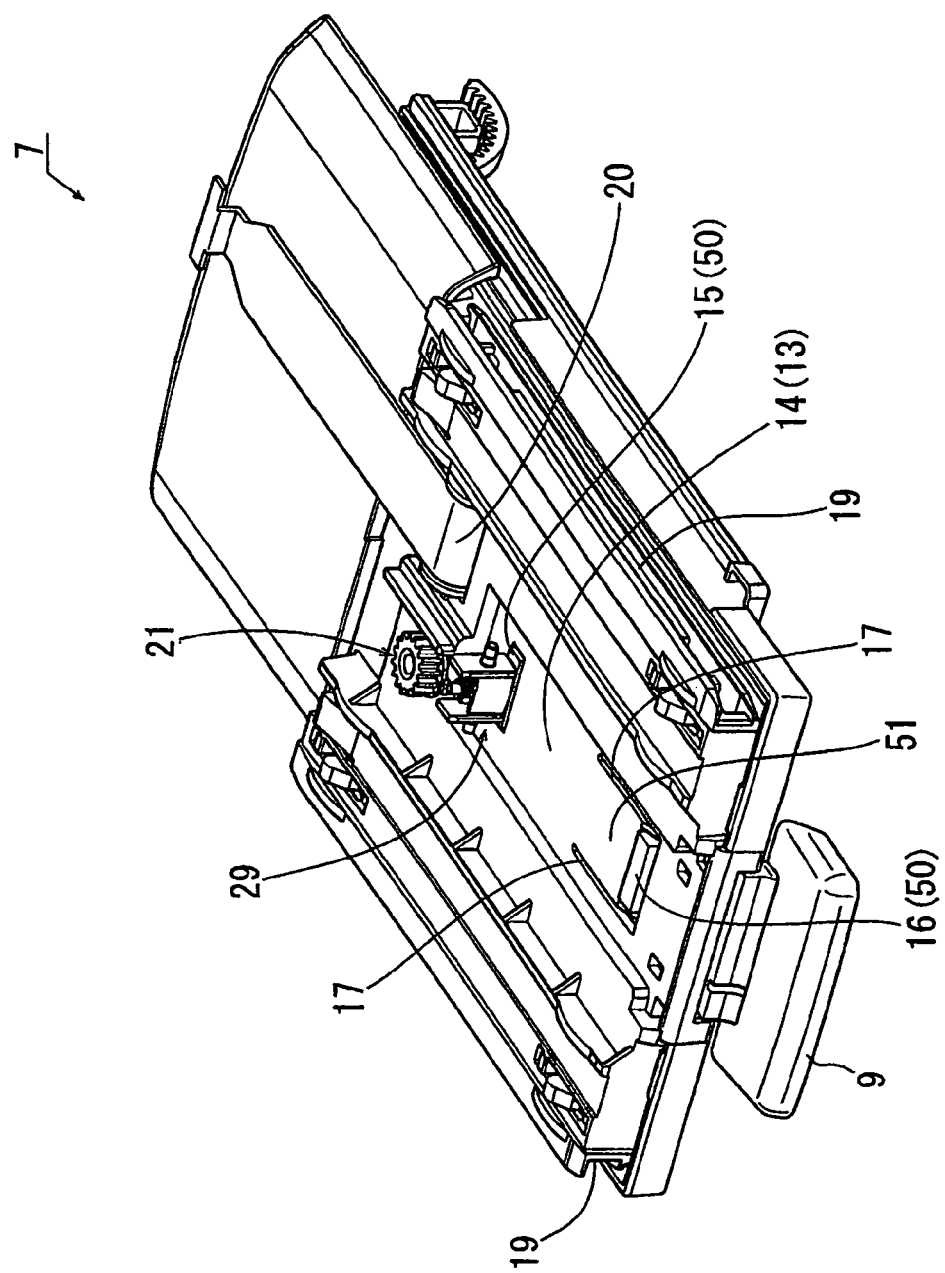
FIG. 4 is a perspective view showing the base member according to the embodiment.
Figure 5:
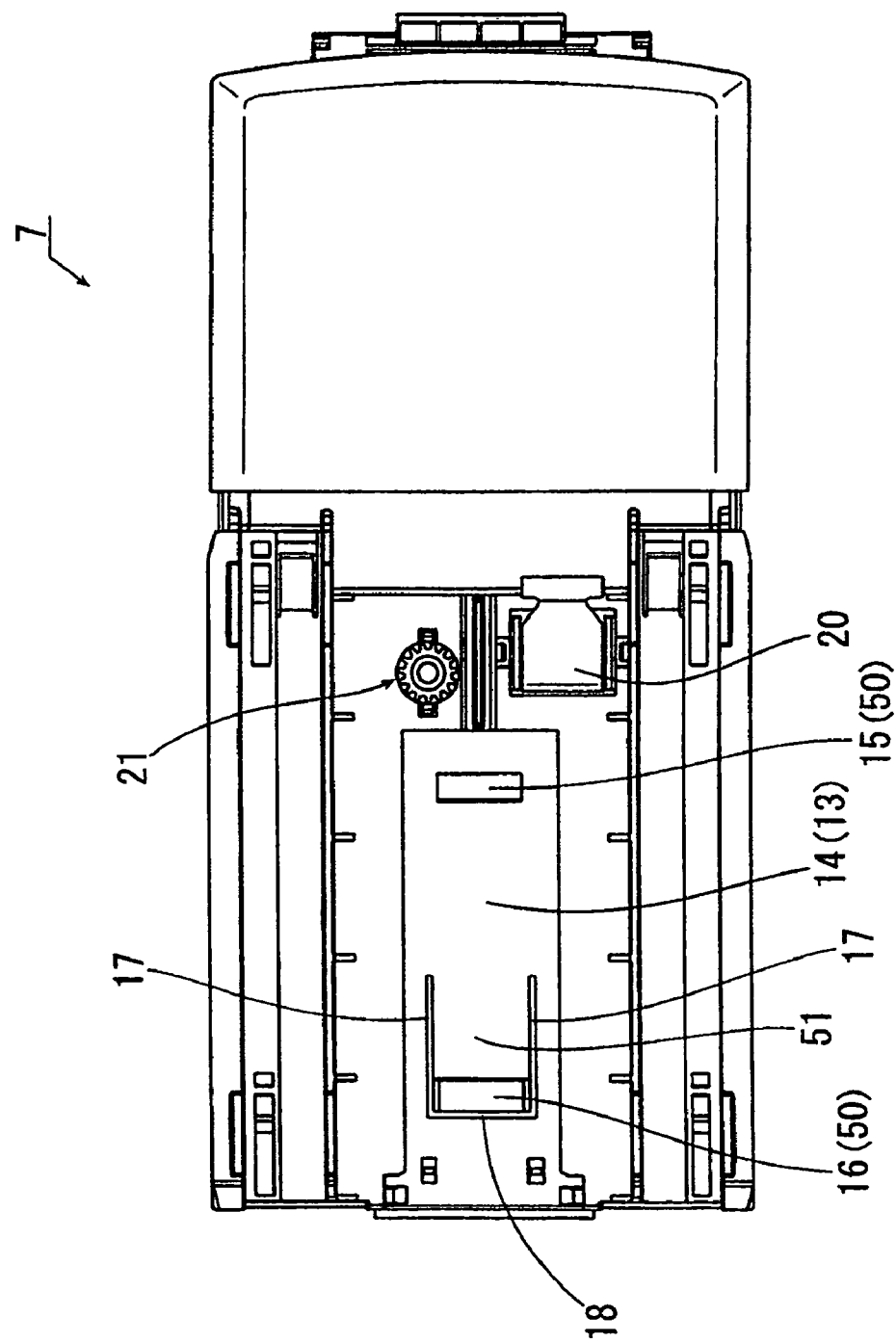
FIG. 5 is a plan view showing the base member according to the embodiment.
Figure 6:
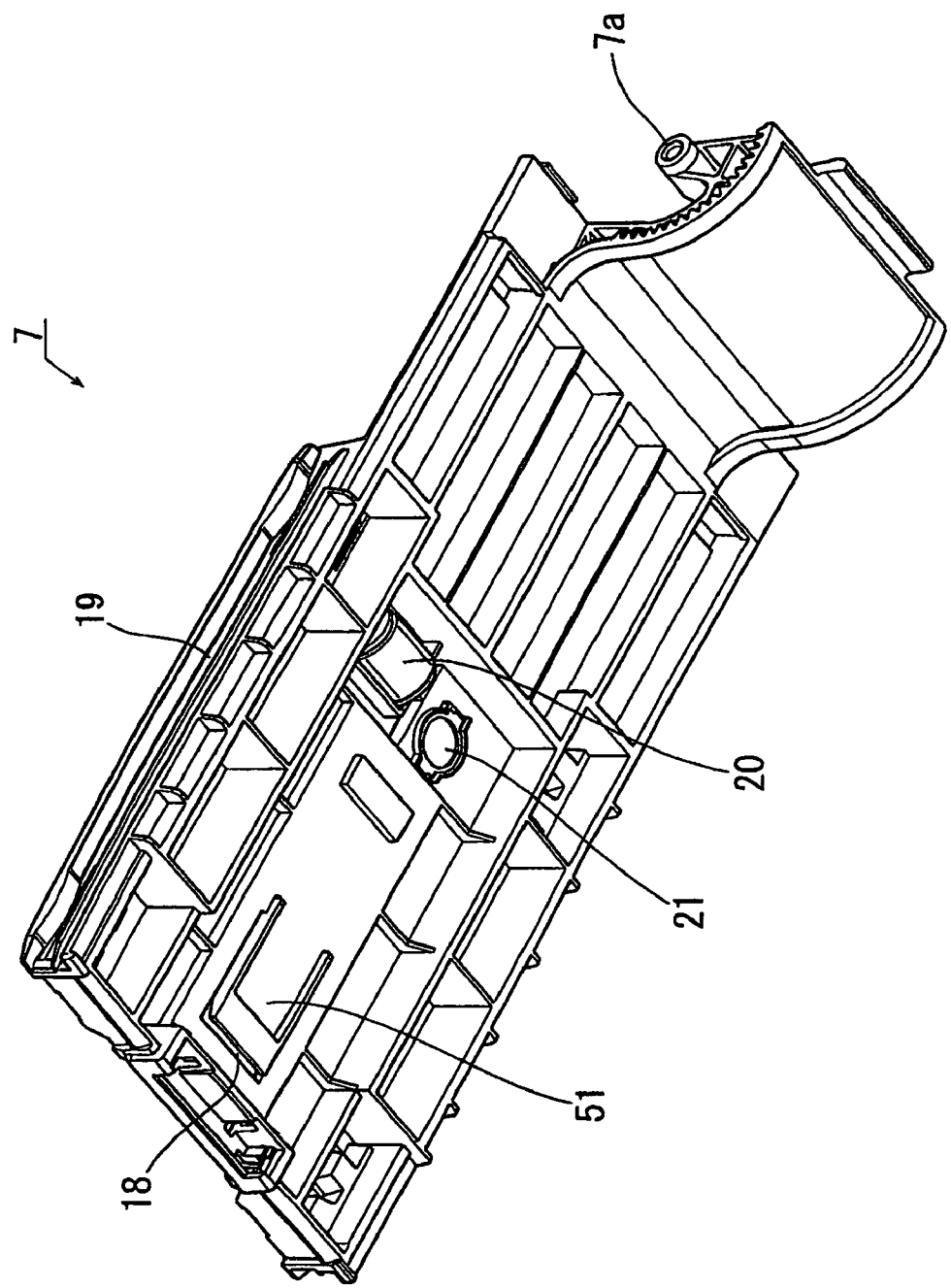
FIG. 6 is a perspective view showing the base member according to the embodiment, which is seen from a rear side of the base member.

The base member 7 has guide grooves 19 disposed on both lateral sides so as to slide the lid 3, a spring member 20 disposed so as to cooperate with the lid 3 to bias the lid 3 in the front direction, and a pinion 21 disposed so as to apply a resistive force against the sliding movement of the lid 3. In FIG. 4, it is shown that an engagement member 29, which will be described later, has entered in the first positioning recess 15 as one of the engagement portions.

Figure 7:
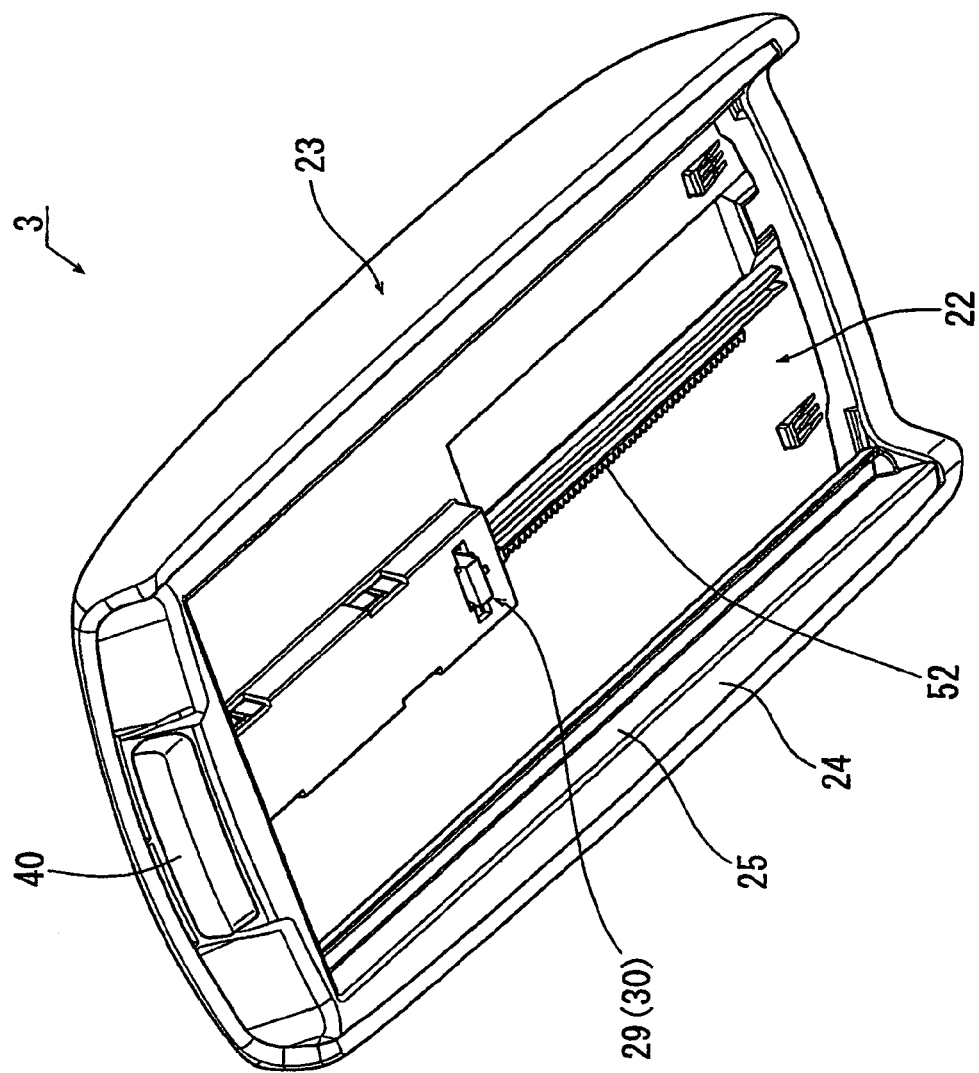
FIG. 7 is a perspective view showing the slide member according to the embodiment, which is seen from a rear side of the slide member.

As shown in FIG. 2 and FIG. 3, the lid 3 is retained on the base member 7 so as to be slidable with respect to the base member. As shown in FIG. 2, FIG. 3, FIG. 7 and FIG. 8, the lid 3 includes a slide member 22 and a cover member 23, and the slide member 22 has an upper side covered with the cover member 23. The slide member 22 is formed as a substantially plate-like member having an elongated shape so as to correspond to the base member 7 and has hanging walls 24 disposed on both sides in a width direction thereof, respectively. Each of the hanging walls 24 has a guide 25 on an inner side. Each of the guides 25 extends in a longitudinal direction of the slide member 22. The slide member 22 is placed on the base member 7 so as to surround the base member 7 therein. The respective guides 25 of the respective hanging walls 24 are brought into engagement with the respective guide grooves 19 of the base member 7 so as to be slidable. Thus, the slide member 22 is slidable in the front and rear directions with respect to the base member 7, being guided by the guides 25 and the guide grooves 19. In FIG. 7, reference numeral 52 designates a rack engageable with the pinion 21 disposed on the base member 7.

Figure 8:
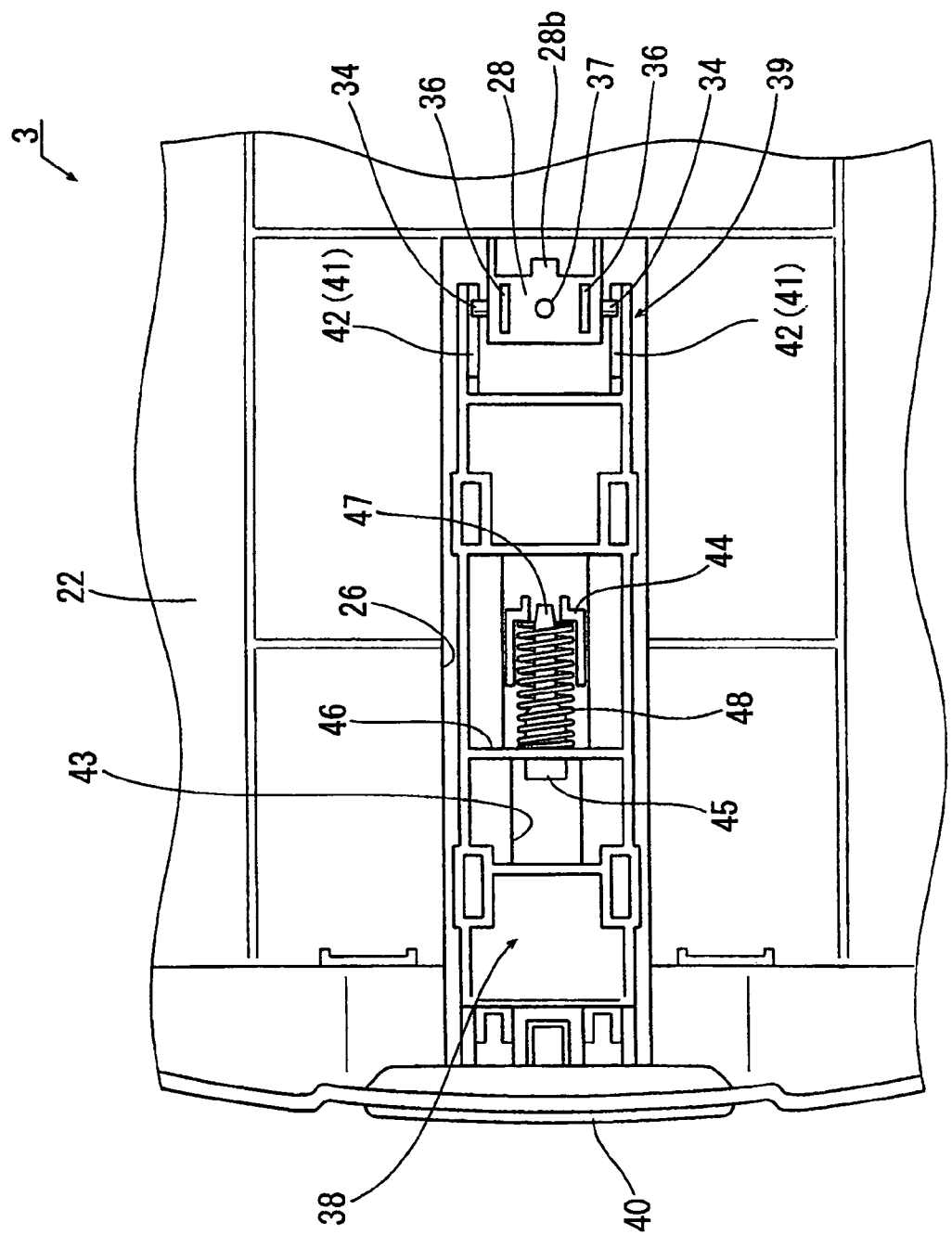
FIG. 8 is a plan view showing a main body of the slide member according to the embodiment.
Figure 9:
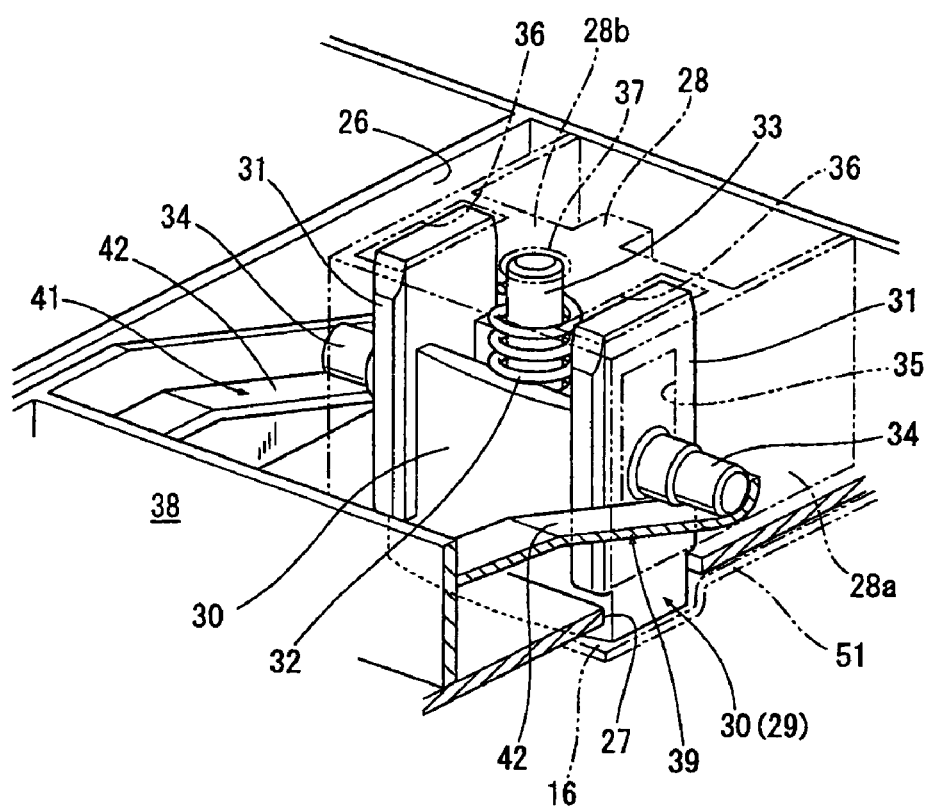
FIG. 9 is a schematic view explaining how the engagement member according to the embodiment ascends and descends.
Figure 10:
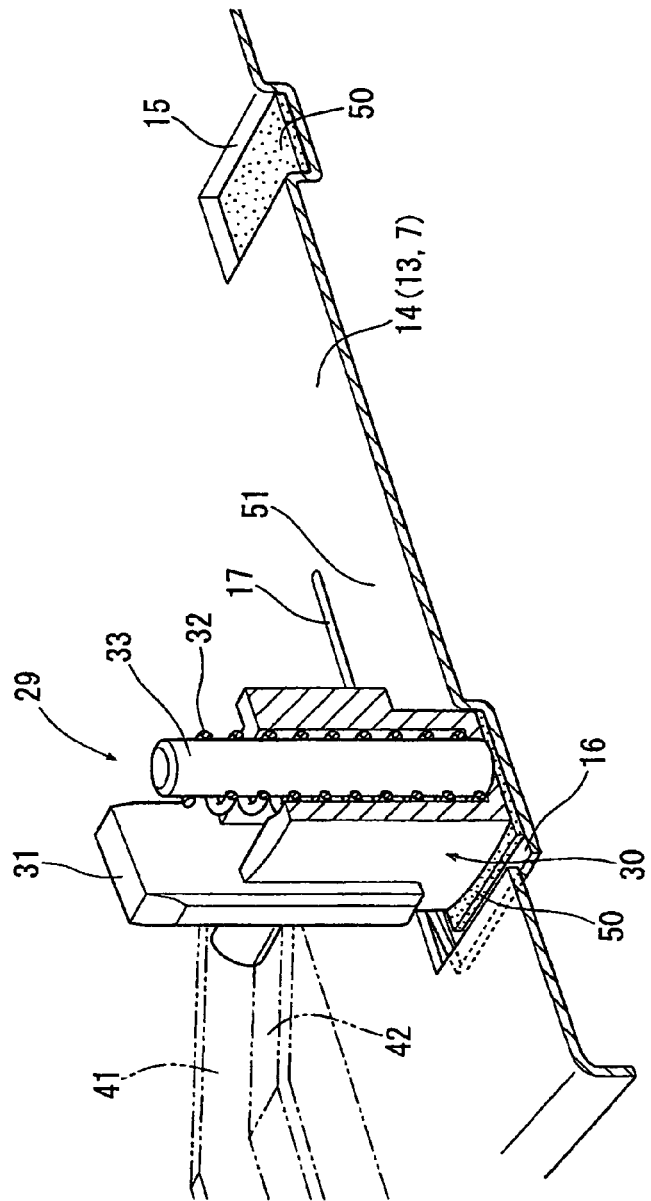
FIG. 10 is a schematic view showing the relationship between the engagement member and each positioning recess in the embodiment.

As shown in FIG. 2, FIG. 3, FIG. 8 and FIG. 9, the slide member 22 has a guide recess 26 formed therein. The guide recess 26 is formed by protruding a portion of the slide member 22 downward, and the guide recess 26 extends in the rear direction from a front end of the slide member 22 to a substantially central portion in the longitudinal direction of the slide member 22. The guide recess 26 has an elongated hole 27 formed at a position closer to a rear end thereof in a bottom so as to extend in a width direction thereof (see FIG. 9). The engagement member 29 is disposed in a guide box 28, which is disposed so as to bridge over the elongated hole 27 in the front and rear directions. As shown in FIG. 9 and FIG. 10, the engagement member 29 includes a main body 30, a pair of guide plates 31, a spring-loaded pin 33 and a pair of guide shafts 34 for lifting movement, the paired guide plates protruding upward so as to also serve as both lateral sides of the main body 30, the spring-loaded pin protruding upward from a central portion of the main body 30 as in the guide plates and having a spring mounted around an outer periphery thereof, and the paired guide shafts protruding laterally from the respective guide plates 31 of the main body 30. The guide box 28 has an opening formed in a bottom portion such that the inner space of the guide box 28 faces the elongated hole 27 through the bottom opening (the bottom opening of the guide box 28 is also indicated by reference numeral 27). The guide box 28 is configured to have both lateral walls 28a located at a position corresponding to a position inside the elongated hole in a longitudinal direction of the elongated hole. The respective lateral walls 28a have cutouts 35 formed to extend vertically and to open into the elongated hole 27 formed at the bottom portion of the guide box 28. Thus, the engagement member 29 is housed into the guide box 28 through the elongated hole 27 from a lower side of the slide member 22 such that the respective guide shafts 34 for lifting movement of the engagement member 29 protrude outward through the cutouts 35 of the guide box 28 after passing through the elongated hole 27. The guide box 28 has through holes 36 and 37 formed in a top wall 28b so as to receive the paired guide plates 31 and the spring-loaded pin 33. Since the paired guide plates 31 and the spring-loaded pin 33 can move, passing through the through holes 36 and 37, the engagement member 29 is made movable in a vertical direction. By this arrangement, the engagement member can take two positions of a downwardly protruding position where a lower edge of the main body 30 of the engagement member protrudes from a lower side of the bottom of the guide recess 26 (the lower side of the slide member 22) and a retracted position where the lower edge of the main body of the engagement member is retracted into the guide box 28 from the protruding position.

The guide recess 26 houses an elongated movable body 38 so as to be slidable therein as shown in FIG. 2, FIG. 3, FIG. 8 and FIG. 9. The movable body 38 extends between the guide box 28 and a front portion of the slide member 22, and has a rear end formed with a lifting mechanism 39 and a front end formed with an operating button 40 as an engagement-member operating member. The lifting mechanism 39 has a pair of legs 41 extending so as to pass over the elongated hole 29 while sandwiching the lateral walls 28a of the guide box 28, and the respective legs 41 have guide surfaces 42 formed thereon, respectively. Both guide surfaces 42 are inclined so as to have a higher position toward the front end. Both guide surfaces 42 function not only to receive the paired guide shafts 34 for lifting movement of the engagement member but also to move up and down the paired guide shafts 34 for lifting movement according to the movement of the guide surface 42 in the front and rear directions. In the shown embodiment, the spring-loaded pin 33 has a coil spring 32 interposed between the main body 30 of the engagement member and the upper wall 28b of the guide box 28 such that the engagement member 29 is biased in a direction to press the respective guide shafts 34 for lifting movement against the respective guide surfaces 42 under the biasing action of the coil spring. As shown in FIG. 8, the movable body 38 has a wide slit 43 formed in a portion thereinside in a longitudinal direction thereof so as to extend in the front and rear directions such that the wide slit 43 faces the bottom of the guide recess 26. The bottom of the guide recess 26 has a receiver 44 for a spring and a stopper 45 formed thereon so as to be upright in the slit 43 while the movable body 38 has a partition wall 46 formed thereon so as to be positioned between the receiver 44 and the stopper 45. The partition wall 46 has a spring-loaded pin 47 formed thereon so as to protrude toward the receiver 44, and the spring-loaded pin 47 has a coil spring 48 disposed therearound such that the movable body 38 is biased in a direction to bring the partition wall 46 into contact with the stopper 45 under the biasing action of the coil spring 48. By this arrangement, when the partition wall 46 is brought into contact with the stopper 45, the movable body 38 is placed at the most forward position, where the paired guide surfaces 42 with the paired guide shafts 34 for lifting movement being placed thereon (brought into contact therewith) are placed at the lowest position, with the result that the lower edge of the main body 30 of the engagement member 29 protrudes downward from the lower side of the slide member 22. On the other hand, when the operating button 40 is depressed, the movable body 38 is moved in the rear direction to retract the paired guide surfaces 42, and the guide shafts 34 for lifting movement are moved up by the respective guide surfaces 42, with the result that the lower edge of the main body 30 is retracted into the guide box 28 (the guide recess 26) from the protruding position.

The engagement member 29 is movably placed so as to selectively face the first positioning recess 15 and the second positioning recess 16 in accordance with the sliding movement of the slide member 22. By this arrangement, in a case where the operating button 40 is not operated, when the lower edge of the main body 30 of the engagement member is placed at a position to face the first positioning recess 15, the lower edge of the main body 30 of the engagement member is introduced into the first positioning recess 15 to retain the lid 3 in a state where the lid 3 substantially entirely overlaps the base member 7 (the state shown in FIG. 2) based on the engagement relationship between the lower edge of the main body 30 of the engagement member and the inner walls (front and rear walls) of the first positioning recess 15. On the other hand, when the lower edge of the main body 30 of the engagement member is placed at a position to face the second positioning recess 16, the lower edge of the main body 30 of the engagement member is introduced into the second positioning recess 16 as shown in FIG. 10 to retain the lid 3 in a state where the lid 3 protrudes from the base member 7 (the state shown in FIG. 3) based on the engagement relationship between the lower edge of the main body 30 of the engagement member and the inner walls (front and rear walls) of the first positioning recess 16.

In the console box 1 as constructed above, when the lower edge of the main body 30 of the engagement member is introduced into the first positioning recess 15, the lid 3 is positioned to substantially overlap the base member 7 while when the lower edge of the main body 30 of the engagement member is protruded into the second positioning recess 16, the lid 3 is positioned in a state to be more forward than the base member 7. Since the respective states are retained unless the engagement member 29 is retracted from the respective positioning recesses 15(16) by depressing the operating bottom 40, the lid 3 is reliably retained in either one of the positioning states. On the other hand, with respect to the positional adjustment of the lid 3, the engagement member 29 can be retracted from the positioning recess with the engagement member currently introduced thereinto (the first or the second positioning recess 16), by depressing the operating button 40. When a sliding force is applied to the lid 3 with the operating button being depressed, the lid 3 is smoothly slided with respect to the base member 7. Thus, the engagement member 29 of the lid 3 can be moved to a different positioning recess (the second or first positioning recess 15), being simply, positioned in the different positioning recess.

Figure 11:
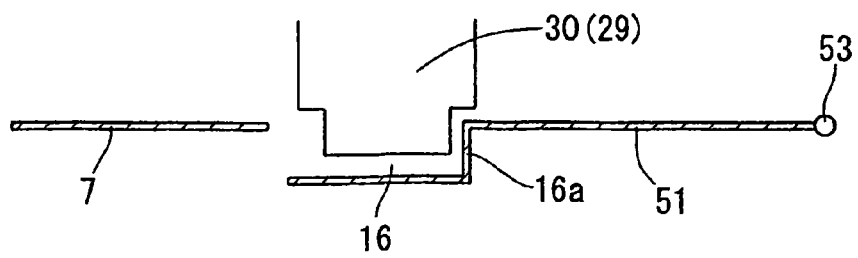
FIG. 11 is a schematic view explaining the operation of the engagement member in a cantilevered portion (a second positioning recess.
Figure 12:
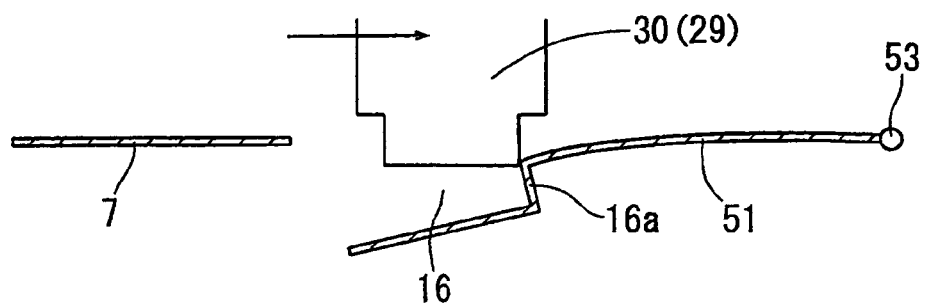
FIG. 12 is a view showing the operation state following the operation state shown in FIG. 11.
Figure 13:
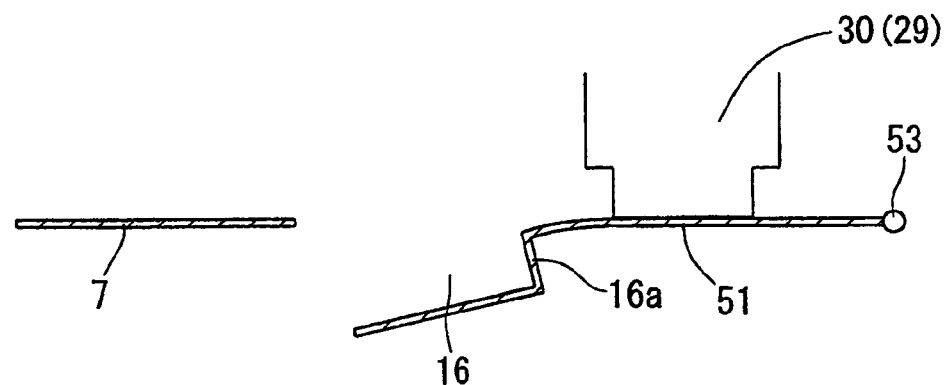
FIG. 13 is a view showing the operation state following the operation state shown in FIG. 12.

In a case where the lid 3 is retained in the protruding state to be more forward than the base member 7, when a relatively large external force (caused by, e.g. interference with a hand grasping the shift lever 4 during the operation of the shift lever 4) is accidentally applied to a front portion of the lid 3, the external force is applied to a rear wall 16a of the second positioning recess through the lower edge of the main body 30 of the engagement member to flex the cantilever member 51 as shown in FIG. 12 even if the lower edge of the main body 30 of the engagement member is introduced into the second positioning recess 16 as shown in FIG. 10 and FIG. 11. When the cantilever member 51 is further flexed, the lower edge of the main body 30 of the engagement member is brought out of engagement with the rear wall 16a of the second positioning recess as shown in FIG. 13. Thus, the lid 3 is retracted to reduce the external force applied. It should be noted that the cantilever member 51 has a flexibility properly set at a desired level. When the application of the external force is discontinued after that, the slide member 22 is forward slid to return to the protruding state under the restoring force of the spring 20, causing the lower edge of the main body 30 of the engagement member to be introduced into the second positioning recess 16.

In FIG. 11 to FIG. 13, symbol "○" (indicated by reference numeral 53) designates a fulcrum where the cantilever member 51 flexes (the rear ends of the slits 17).

As explained above, the console box 1 can secure the requirements of facilitating the positional adjustment of the lid 3, allowing the lid 3 to be retracted by application of an accidental relatively large external force and having a high position-retaining force for the lid 3 in normal use.

Although the preferred embodiment will be described, the present invention may contain any one of the features described below.

(1) The box body 2, the lid 3 and another member are formed of a suitable material, such as a plastic material.

(2) The box body 2 has no opening 6 formed in a top end, and the upper wall member is integrally formed with the box body 2.

(3) The first and second positioning recesses 15 and 16 are formed in the slide member 22, and the engagement member 29 is disposed on the base member 7.

(4) Each of the first and second positioning recesses 15 and 16 is disposed at plural positions.

The object of the present invention is not limited to the specified one and implicitly contains to provide ones described as being substantially preferred or advantageous.

The entire disclosure of Japanese Patent Application No. 2007-198063 filed on Jul. 30, 2007 including specification, claims, drawings and summary is incorporated herein by reference in its entirety.

The invention claimed is:

1. A console box comprising a box body and a lid disposed on the box body so as to be slidable thereon; further comprising:
    the box body including an upper wall member forming a top end thereof;
    one side of an upper side of the upper wall member and a lower side of the lid having a first engagement portion and a second engagement portion formed thereon, the second engagement portion being disposed at a position closer to a front side than the first engagement portion;
    the other side of the upper side of the upper wall member and the lower side of the lid having an engagement member disposed thereon so as to be selectively protruded from and retracted into the other side under a biasing action;
    the engagement member cooperating with an engagement-member operating member, which serves for retracting the engagement member into the other side;
    the lid being configured to protrude more forward than the upper wall member when the engagement member is brought into engagement with the second engagement member in comparison with a case where the engagement member is brought into engagement with the first engagement portion; and
    the one side having a region where the second engagement portion exists, the region being configured to be deformed so as to bring the second engagement portion out of engagement with the engagement member when a load having a certain value or more is applied to the region through the engagement member engaged with the second engagement portion.

2. The console box according to claim 1, further comprising:
    the box body having an opening formed in the top end;
    the upper wall member being configured to be swingably supported by the box body so as to open and close the opening of the box body; and
    the lid being retained on the upper wall member so as to be slidable with respect to the upper wall member.

3. The console box according to claim 1, further comprising:
    the one side having a cantilever member formed therein such that the cantilever member has a leading end facing a front side of the one side; and
    the leading end of the cantilever member having the second engagement portion formed therein.

4. The console box according to claim 3, wherein the cantilever member comprises slits formed in the one side.

5. The console box according to claim 1, wherein the first engagement portion and the second engagement portion are formed on the upper side of the upper wall member;
    the engagement member is formed on the lower side of the lid; and
    the engagement-member operating member is disposed in a front portion of the lid.

6. The console box according to claim 5, wherein the upper wall member has a cantilever member formed therein, the cantilever member comprising slits formed in the upper wall member such that the cantilever member has a leading end facing a front side of the upper wall member;
    the first engagement portion comprises a first engagement recess, and the second engagement portion comprises a second engagement recess, the second engagement recess being formed in a leading portion of the cantilever member; and
    the upper side of the upper wall member is formed as a flat surface at least in the cantilever member and in a position between the cantilever member and the first engagement recess.

7. The console box according to claim 6, further comprising:
    a spring interposed between the upper wall member and the lid; and
    the spring being configured to bias the lid toward a position more forward than the front side of the upper wall member.

* * * * *